United States Patent [19]
McKinnon

[11] Patent Number: 5,958,029
[45] Date of Patent: Sep. 28, 1999

[54] METHOD AND SYSTEM FOR EFFICIENT MESSAGE VALIDATION

[75] Inventor: Gordon William McKinnon, Austin, Tex.

[73] Assignee: Motorola, Inc., Schaumburg, Ill.

[21] Appl. No.: 08/954,265

[22] Filed: Oct. 20, 1997

[51] Int. Cl.[6] ............................................. G06F 13/00
[52] U.S. Cl. ........................................ 710/100; 710/105
[58] Field of Search .................................... 395/285, 286, 395/741, 840, 842, 868, 869; 710/100, 105, 106, 268, 20, 22, 23, 48, 49

[56] References Cited

U.S. PATENT DOCUMENTS

| | | | |
|---|---|---|---|
| 5,027,349 | 6/1991 | Thorne | 370/85.1 |
| 5,444,626 | 8/1995 | Schenk | 364/431.04 |
| 5,469,150 | 11/1995 | Sitte | 340/825.07 |
| 5,551,053 | 8/1996 | Nadolski et al. | 395/829 |
| 5,675,830 | 10/1997 | Satula | 395/829 |
| 5,801,948 | 9/1998 | Wood et al. | 364/468.15 |

OTHER PUBLICATIONS

Motorola, Inc. 1996, "HC08 HCMOS Microcontroller Unit Technical Summary", Section 23 mcCAN08 Controller, pp. 23–1 thru 23–33.

Motorola, Inc. 1996, "HC08 MC68HC08XL36 HCMOS Microcontroller Unit Technical Data", Direct Memory Access Module (DMA), pp. 107–140.

Primary Examiner—Ayaz R. Sheikh
Assistant Examiner—Xuan M. Thai
Attorney, Agent, or Firm—Paul J. Polanksy

[57] ABSTRACT

A communications processor (30) includes a DMA controller (34) and a module associated with a broadcast communications protocol such as a CAN module (50), both connected to a common internal bus (36). The CAN module (50) includes a single comparator (56) for comparison of multiple identifier mask values with the identifier of a message transmitted on the CAN bus (25). The communications processor (30) also includes a random access memory (RAM) (40) which stores the multiple identifier mask values which the DMA controller (34) automatically transfers to the CAN module (50) without intervention by the CPU (32). In addition, the CAN module (50) provides a valid message interrupt to the CPU (32) only after the message has been validated and does not interrupt the CPU (32) when messages intended only for other nodes are encountered.

12 Claims, 2 Drawing Sheets

METHOD AND SYSTEM FOR EFFICIENT MESSAGE VALIDATION

FIELD OF THE INVENTION

This invention relates in general to processors for communications systems, and more specifically to communications processors which perform message validation.

BACKGROUND OF THE INVENTION

Certain types of communications systems such as factory automation and automobile electrical systems utilize what is known as a broadcast bus. In a broadcast bus system, many devices are connected to a common physical interface. Messages are transmitted between various nodes of the broadcast bus by including within each message packet a field, designated generally as an identifier field, which provides address information corresponding to one or more nodes. In order for a particular node to determine whether the broadcast message is addressed to it, it examines certain critical bits of the identifier and compares these bits to stored values. In such broadcast systems, a node may be able to recognize and respond to multiple identifiers. One type of broadcast bus system is known as a controller area network (CAN) and is defined by the BOSCH specification dated September 1991. CAN bus systems are especially useful in automotive applications where many devices such as sensors, motor controllers, and the like are controlled through a common physical bus.

Typically, communications processors which connect to broadcast buses and which recognize multiple identifiers have required significant overhead to validate a message. As used here, the term "validate" means to determine whether the message is addressed to that node by determining whether the identifier matches one or more corresponding identifiers defined for that node. For example, upon recognizing an identifier field of a message on the broadcast bus, a conventional communications processor must perform a series of comparison operations. For each operation, such conventional system would be required to fetch a mask corresponding to an identifier which is associated with that node. The mask would be input to a first input of a comparator. Also input to the comparator is the identifier, and the output of the comparator indicates whether the message is valid for that node. After this comparison is done, the CPU would fetch a second mask and perform a similar comparison, repeating the operation until all potential identifier masks have been compared to the identifier, or until a match is found.

This operation requires a significant amount of processing overhead. Each time the identifier is received, the broadcast bus interface circuitry interrupts the communications processor's central processing unit (CPU). In response to the interrupt, the CPU places certain information on the stack, requiring many clock cycles. The CPU must fetch instructions which load the mask's address into an index register. The result of this overhead is that the speed of the broadcast bus is limited. For example the CAN protocol specifies bus operation at 1 megahertz (MHz). However processing limitations, such as the use of inexpensive 8-bit microcontrollers, may limit the bus speed to a fraction of 1 MHz.

An alternative known technique for performing message validation uses multiple comparators. Each comparator has a first input hard-wired to a corresponding mask register. The second input of the comparator receives the identifier of the current frame. The comparator which detects a match then signals an interrupt to the CPU, which then performs further processing. While not requiring the same amount of overhead as the method described above, this method does require a significant amount of integrated circuit area for the extra comparators.

What is needed then is a data processing system which is able to validate messages quickly and with a minimum amount of hardware. Such a data processing system and a method for performing such message validation is provided by the present invention, whose features and advantages will become apparent with reference to the detailed description and the accompanying drawings.

DETAILED DESCRIPTION OF A PREFERRED EMBODIMENT

Figure 1:
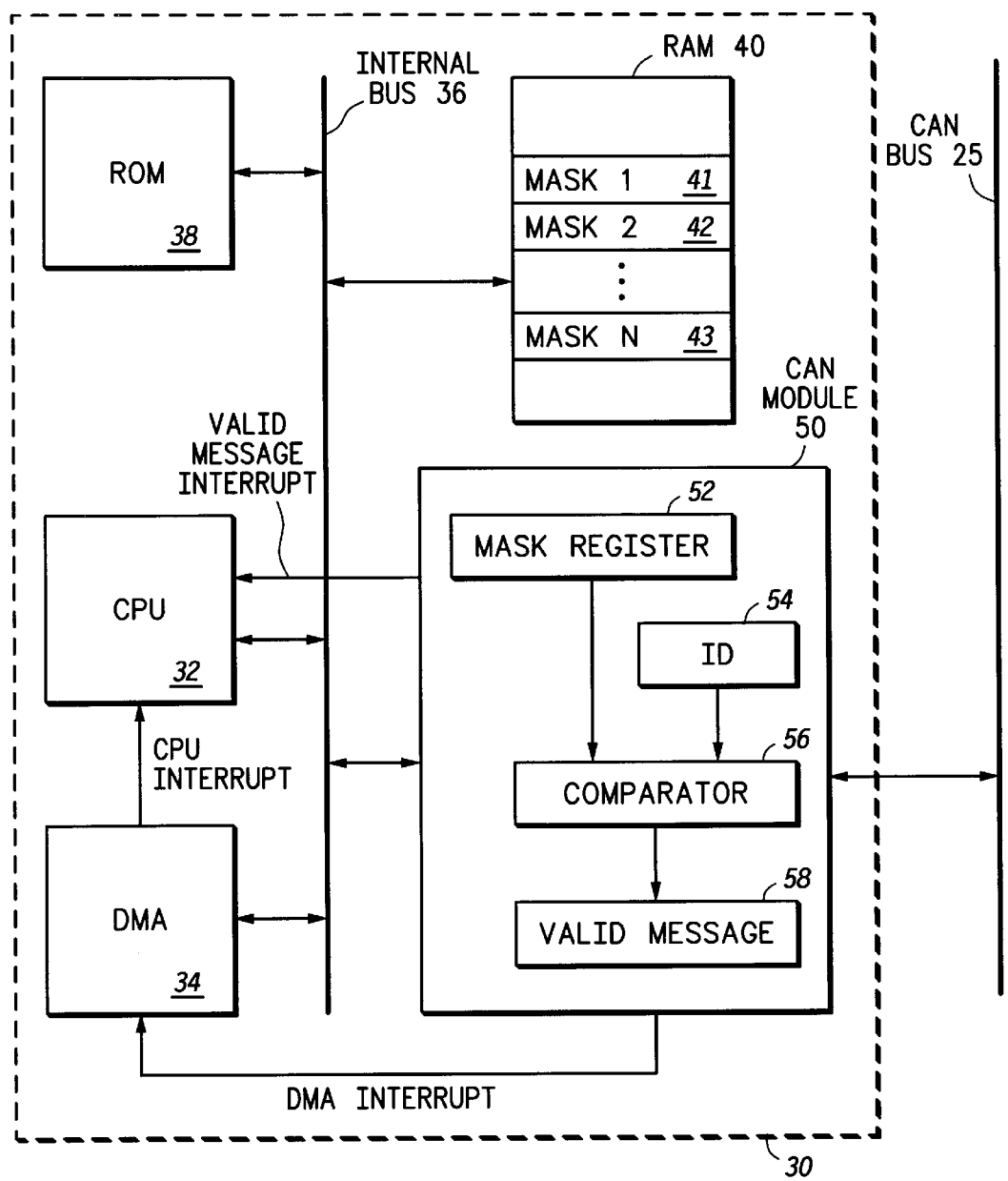
FIG. 1 illustrates in block diagram form a portion of a broadcast communication system according to the present invention.

FIG. 1 illustrates, in block diagram form, a portion 20 of a broadcast communication system according to the present invention. Portion 20 includes generally a communications processor 30 which is connected bidirectionally to a broadcast bus, such as CAN bus 25 illustrated in FIG. 1. Note that while CAN bus 25 conducts serial data by differential symbols conducted on two wires, communications processor 30 may be used with other types of buses such as single-wire buses and parallel buses. Communications processor 30 includes generally a central processing unit (CPU) 32, a direct memory access (DMA) controller labeled "DMA" 34, an internal bus 36, a read-only memory (ROM) 38, a random access memory (RAM) 40, and a CAN module 50.

CPU 32 is a data processor which accesses instructions typically stored in ROM 38 and performs these instructions by executing operand cycles over internal bus 36. Thus, CPU 32 has a bidirectional connection to internal bus 36. Note that internal bus 36 conducts address, data, and control signals related to memory accesses. CPU 32 also has a first input terminal for receiving a signal labeled "CPU INTERRUPT", and a second input terminal for receiving a signal labelled "VALID MESSAGE INTERRUPT". In response to receiving either CPU interrupt signal, CPU 32 stores the contents of its internal registers on a stack, typically located in RAM 40. CPU 32 also receives an interrupt vector, which is the address of an interrupt handler routine corresponding to the active interrupt. CPU 32 then starts executing instructions at the interrupt vector address to service the interrupt. In communications processor 30, CPU 32 may be implemented by a conventional 8-bit microcontroller core such as the MC68HC08 available from Motorola, Inc.

DMA 34 has an input for receiving a signal labeled "DMA INTERRUPT", an output for providing the CPU INTERRUPT signal, and is bidirectionally connected to internal bus 36. DMA 34 is a conventional DMA controller which typically includes source and destination address registers, length registers, and the like as is well known in the art. For example, DMA 34 may be implemented with the DMA controller contained on the MC68HC708XL36, also available from Motorola, Inc., which is a three-channel controller.

RAM 40 is conventional block of static random access memory which is used for parameter storage by CPU 32.

RAM 40 includes several locations for storing identifier mask values associated with message validation on CAN bus 25, including a first mask register labeled "MASK 1" 41, a second mask register labeled "MASK 2" 42, and an Nth mask register labeled "MASK N" 43. In RAM 40, N is a number of arbitrary size which corresponds to the number of unique identifiers to which communications processor 30 will respond to.

CAN module 50 includes generally a mask register 52, an identifier register labeled "ID" 54, a comparator 56, and a valid message register 58. Mask register 52 has an output which is connected to a first input of comparator 56. ID 54 has an output connected to a second input of comparator 56. Comparator 56 also has an output connected to an input of a valid message register 58. Mask register 52 is programmed via internal bus 36 in a manner which will be described below. ID 54 is programmed with the value of the identifier field of each message conducted on CAN bus 25. Thus, CAN module 50 includes circuitry connected to CAN bus 25 which recognizes symbols transmitted on CAN bus 25, converts those symbols into a stream of ordered bytes, and determines which bytes correspond to the identifier portion of the frame. After identifying the identifier portion, it stores the value in ID 54 and activates the DMA INTERRUPT signal. Note that the features and circuitry of CAN module 50 which are not important in understanding the present invention may be implemented with the msCAN08 Controller for the MC68HC08AZ32 microcontroller, but will not be further described here.

In response to receiving the DMA INTERRUPT signal, DMA 34 accesses in succession all mask registers stored in RAM 40 as a source of data. The destination of the DMA transfer is mask register 52 which is accessed at a predetermined memory-mapped location. Note that before DMA 34 can complete a subsequent transfer, CAN module 50 has enough time to perform the comparison between the current identifier mask and the identifier stored in ID 54. When it detects a match, CAN module 50 stores an indicator in valid message register 58 to indicate which identifier match has occurred. At the completion of the series of transfers, DMA 34 may activate the CPU INTERRUPT signal to CPU 32. Preferably, however, only CAN module 50 interrupts CPU 32 after detecting an identifier match and validating the message being transmitted on CAN bus 25. Thus, as illustrated in 51, CAN module 50 activates the "VALID MESSAGE INTERRUPT" signal to the second interrupt input terminal of CPU 32. The advantage of notifying the CPU only after validating the message is that the normal processing performed by CPU 32 need not be interrupted if there is no message transmitted on CAN bus 25 addressed to this node.

According to the present invention, a communications processor such as communications processor 30 is able to perform comparisons on multiple identifiers associated with this node by using only a single comparator circuit and in addition to perform multiple comparisons without the usage of CPU 32. Because it requires more overhead for CPU 32 to transfer the mask into mask register 52 than for DMA 34, processing speed is enhanced. In addition, DMA 34 may be programmed with the address of MASK 1 41 and the value of N prior to connection to CAN bus 25 so that message validation may proceed automatically after CAN module 50 recognizes a new message.

Figure 2:
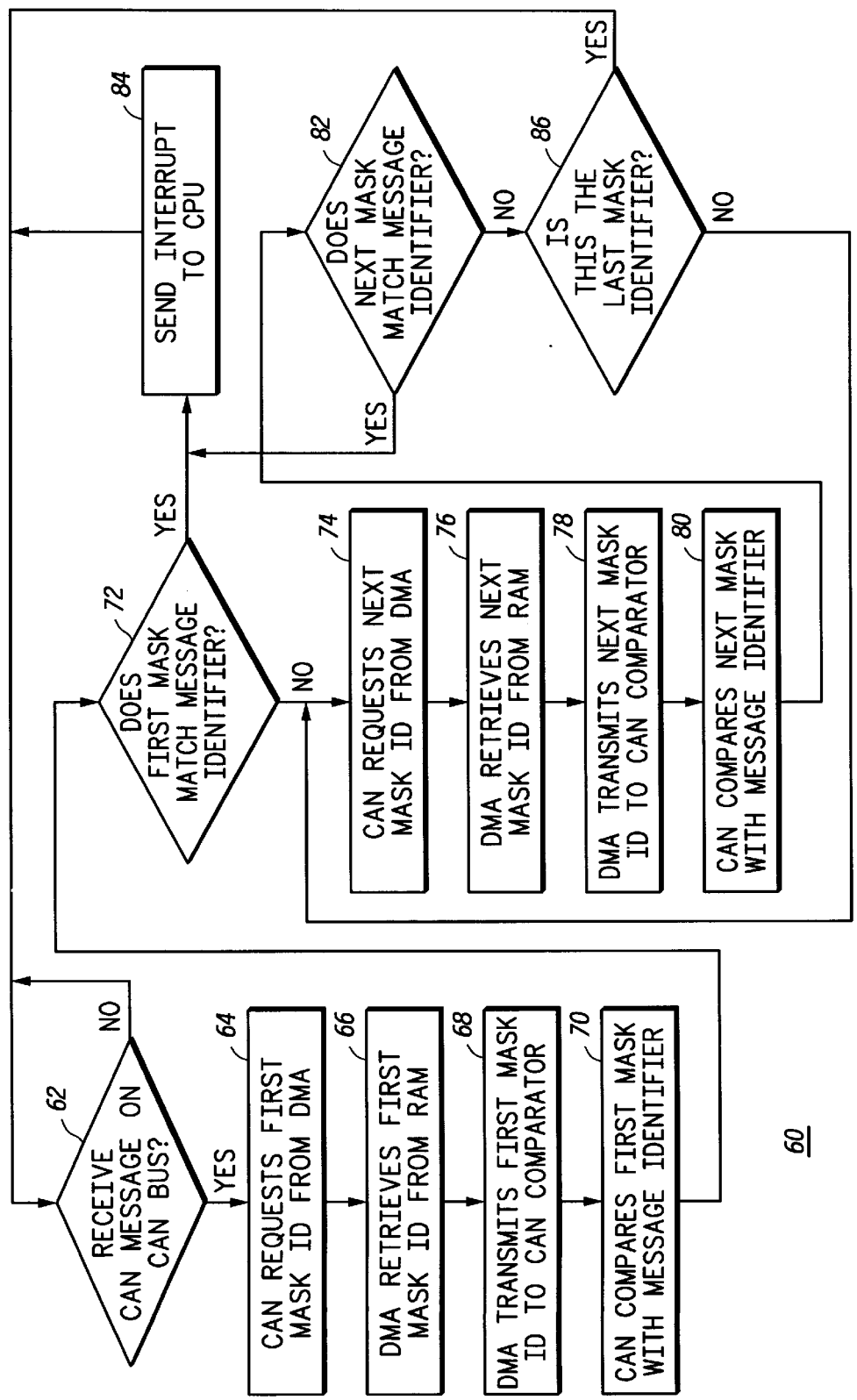
FIG. 2 illustrates a flow diagram of the message validation method performed by the communications processor of FIG. 1.

FIG. 2 illustrates a flow diagram 60 of the message validation method performed by communications processor 30 of FIG. 1. The method starts at a decision 62 in which CAN module 50 detects whether a valid message is being transmitted on CAN bus 25. If a valid message has been received, at step 64 CAN module 50 activates the DMA INTERRUPT signal to request the first identifier mask (i.e., MASK 1 41) from RAM 40. Next, at step 66, DMA 34 retrieves this identifier mask value and stores it in mask register 52 using a conventional source-to-destination DMA transfer. Thus, the read portion occurs at step 66 and the write portion at step 68. After receiving the first identifier mask, comparator 56 in CAN module 50 performs the comparison at step 70. At decision 72, CAN module 50 determines whether there was a match. If CAN module 50 detects a match, at step 84 it outputs the VALID MESSAGE INTERRUPT signal to CPU 32 and the flow returns to decision 62 for the reception of the next message. Note that flow diagram 60 applies to the message validation function only and CAN module 50 performs additional data reception and CPU notification tasks which are not shown in FIG. 2.

If CAN module 50 fails to detect a match between the identifier mask and the message identifier, at step 74 CAN module 50 optionally requests the next identifier maskID from DMA 34 in the case where DMA 34 has been programmed to perform single transfers. If DMA 34 has been programmed to perform the series of transfers automatically, step 74 is omitted. At step 76, DMA 34 retrieves the next identifier mask from RAM 40 and at step 78 stores that value in mask register 52. Then at step 80, CAN module 50 performs the next comparison. At step 82, CAN module 50 again determines whether there is a match between the identifier mask and the identifier. If there is a match, at step 84 CAN module 50 interrupts CPU 32 and the message recognition flow returns to decision 62. If there is no match, however, the flow depends on whether the identifier mask was the last of the group of identifier masks as represented by decision 86. If so, flow returns to decision 62. However, if not, the flow proceeds to steps 74, 76, 78, and decision 82 until the last identifier mask has been encountered or there is a match.

In an alternative embodiment, RAM 40 stores a second set of identifier masks. In this case, the flow proceeds through the first set represented by identifier masks 41–43. After processing all of the first set, if CAN module 50 has not yet detected a match, then it may again interrupt DMA 34, possibly by a second interrupt signal which initiates a second channel to perform the identifier comparison to the identifier masks in the second set.

Thus, according to the present invention, communications processor 30 performing the method illustrated by flow diagram 60 solves both problems of the two known message validation techniques described above. CAN module 50 includes only a single comparator circuit, and thus may be constructed with a minimum of integrated circuit area. In addition, DMA 34 allows the series of comparisons between the multiple identifier masks and the identifier of the CAN message without the need for intervention by CPU 32. Since DMA 34 is able to perform these transfers automatically and more efficiently than CPU 32, overall system efficiency is increased. This increase in efficiency may allow CAN bus 25 to run at a higher speed.

While the invention has been described in the context of a preferred embodiment, it will be apparent to those skilled in the art that the present invention may be modified in numerous ways and may assume many embodiments other than that specifically set out and described above. For example, the communications processor may be used for other broadcast bus protocols than CAN. Also the invention is not limited to a specific version of CAN; the invention is equally applicable to CAN 2.0A, which uses 11-bit identifiers, as well as CAN 2.0B, which uses 29-bit identifiers. Furthermore, many types of DMA controllers may be used and the DMA controller's capabilities may be restricted to minimize circuit area. Accordingly, it is intended by the appended claims to cover all modifications of the invention which fall within the true scope of the invention.

I claim:

1. A system for efficiently performing bus message validation, comprising:

a central processing unit;

an interface module having an interface suitable for communicating on an external broadcast bus, wherein the interface module may receive a plurality of bus messages communicated over the external broadcast bus, each of the plurality of bus messages containing a message identifier designating an intended receiving system for that bus message, and further wherein the interface module generates an interrupt when a bus message is received;

a memory storing multiple mask values;

a comparator coupled to the memory and the interface module, wherein the interface module transfers the message identifier to the comparator; and a controller coupled to the interface module, the comparator and the memory, the controller being programmed to transfer in succession a first plurality of mask values of the multiple mask values to the comparator when the interrupt is generated;

wherein the comparator compares one or more transferred mask values of a plurality of mask values with the message identifier contained in a received bus message and provides an indication to the central processing unit when a comparison indicates a match, wherein a match validates the received bus message for the system.

2. The system of claim 1, wherein the interface module is a controller area network (CAN) module.

3. The system of claim 1, wherein the controller is a direct memory access (DMA) controller.

4. The system of claim 1, wherein the controller transfers a first mask value of the first plurality of mask values in response to the interrupt and transfers a next mask value of the plurality of mask values unless an indication is provided.

5. The system of claim 1, wherein the controller transfers a second plurality of mask values of the multiple mask values to the comparator if the comparison of each of the first plurality of mask values does not indicate a match.

6. The system of claim 1 further comprising a valid message register having an input coupled to the output of the comparator for indicating which of the plurality of transferred mask values resulted in the match.

7. A method of efficiently performing bus message validation in a system coupled to a broadcast bus, the system including a central processing unit (CPU), the method comprising:

receiving a bus message from the broadcast bus, wherein the bus message contains a message identifier designating an intended receiving system for the bus message;

retrieving in succession a first plurality of mask values from a memory by programming a controller separate from the CPU;

comparing the first plurality of mask values retrieved from the memory in a common comparator with the message identifier; and validating the bus message for the system when the step of comparing indicates a match.

8. The method of claim 7, further comprising the step of executing code in the CPU concurrently with the step of comparing the first plurality of mask values retrieved from the memory with the message identifier.

9. The method of claim 7, further comprising repeating the steps of retrieving and comparing until the bus message received from the broadcast bus is validated.

10. The method of claim 9, further comprising continuing to retrieve mask values until a predetermined set of mask values have been compared and the bus message has not been validated.

11. The method of claim 7, further comprising the step of retrieving a second plurality of mask values when each of the first plurality of mask values have been compared and the step of comparing has not indicated a match.

12. The method of claim 7 further comprising the step of storing an indication indicating which of the plurality of transferred mask values resulted in the match in a valid message register.

* * * * *